Figure 1:
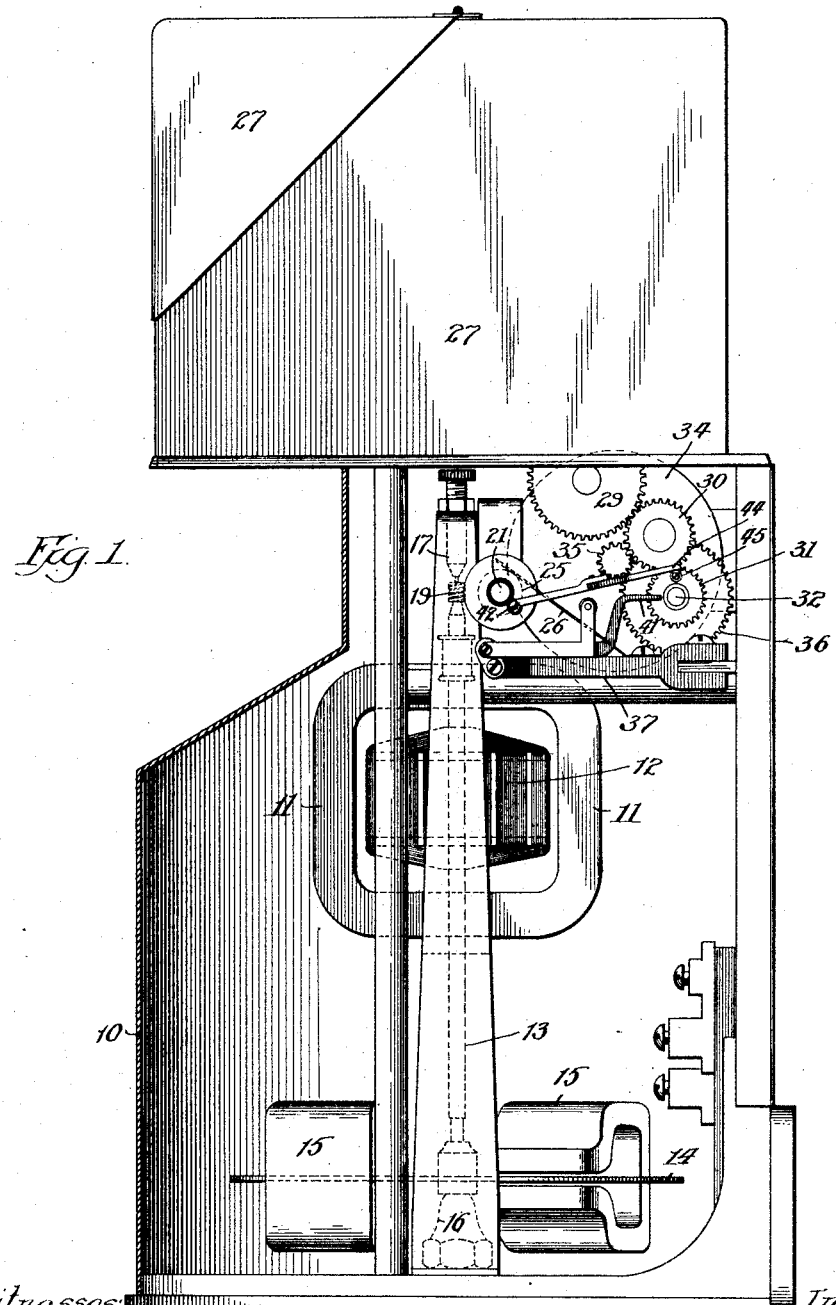

C. M. PAGE.
ACTUATING MEANS FOR ELECTRIC METER RECORDERS.
APPLICATION FILED AUG. 30, 1909.

987,254.

Patented Mar. 21, 1911.

3 SHEETS—SHEET 1.

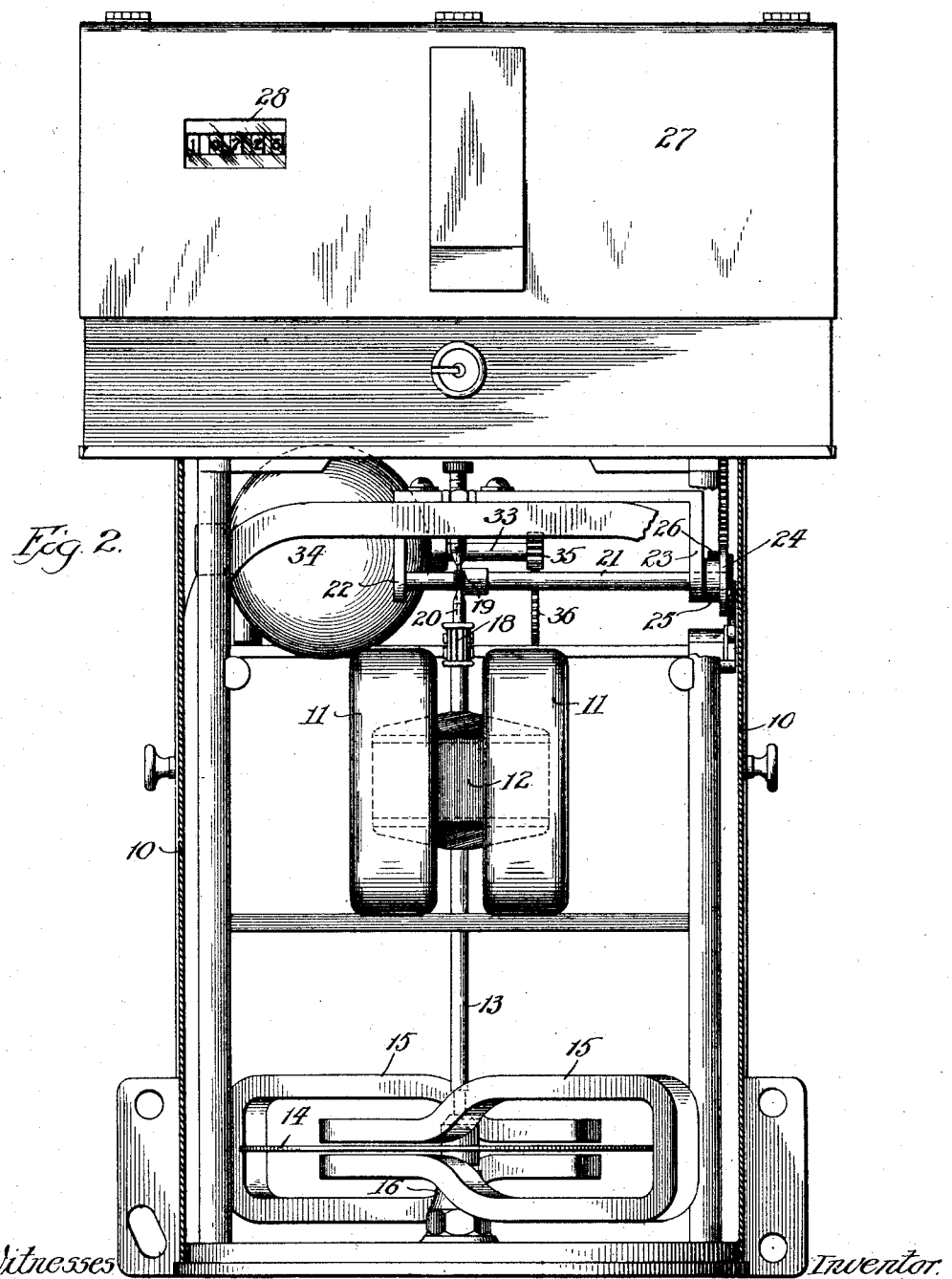

C. M. PAGE.
ACTUATING MEANS FOR ELECTRIC METER RECORDERS.
APPLICATION FILED AUG. 30, 1909.
987,254.
Patented Mar. 21, 1911.
3 SHEETS—SHEET 3.
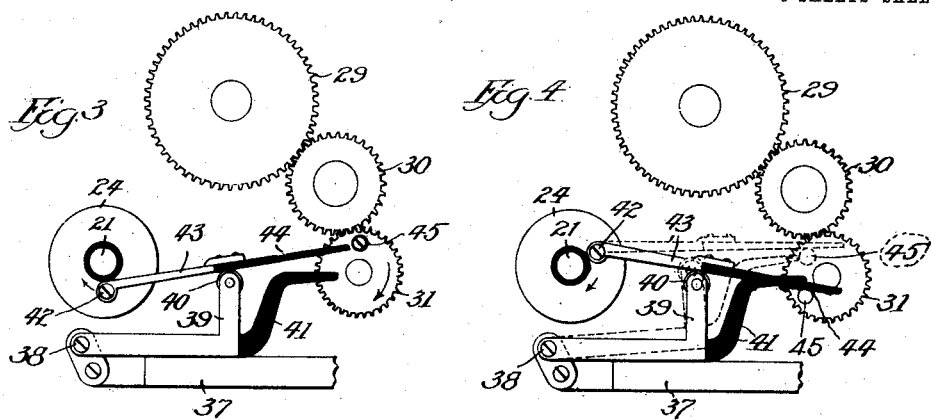
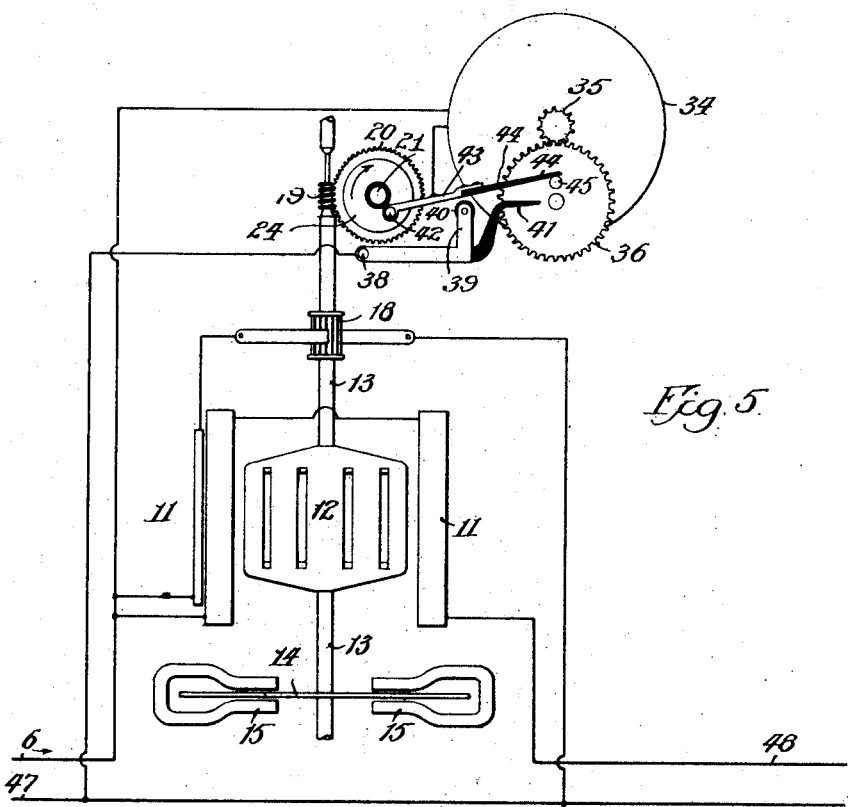
Witnesses:
E. Molitor
Inventor.
Carl M. Page
By Linthicum Belt & Fuller
Attys.
THE NORRIS PETERS CO., WASHINGTON, D. C.

UNITED STATES PATENT OFFICE.

CARL MADISON PAGE, OF DIXON, ILLINOIS.

ACTUATING MEANS FOR ELECTRIC-METER RECORDERS.

987,254.  Specification of Letters Patent.  Patented Mar. 21, 1911.

Application filed August 30, 1909. Serial No. 515,132.

*To all whom it may concern:*

Be it known that I, CARL M. PAGE, a citizen of the United States, residing at Dixon, in the county of Lee and State of Illinois, have invented certain new and useful Improvements in Actuating Means for Electric-Meter Recorders, of which the following is a specification.

My invention pertains to registering and recording means for electric and similar meters, such means being driven by an electric motor, the circuit of which is momentarily and intermittently closed when the meter is in operation to effect a definite and predetermined actuation of the register. Obviously, since electric meters are comparatively delicate mechanisms, the electric switch or controller for the register motor circuit must consume but an extremely small amount of power for its actuation, and such switch must open quickly to eliminate or diminish to a minimum the arcing or sparking at its terminals. Consequently my invention, among other things, aims to provide a switch which will meet these requirements.

In the accompanying drawings, which form a part of this specification, and to which reference should be made for a complete understanding of my invention as embodied in a preferred form, like reference characters refer to the same parts throughout the various views.

In these drawings,—Figure 1 is an end elevation, with the casing broken away, of an electric meter and register equipped with mechanism embodying this invention; Fig. 2 is a front elevation of the parts shown in Fig. 1, the inclosing casing or housing being sectioned to more clearly show the parts; Figs. 3 and 4 are views of the electric switch or controller, indicating the parts in different positions; and Fig. 5 illustrates somewhat conventionally the parts of the mechanism and the electric circuits.

Referring to these drawings, it will be apparent that the electric meter is inclosed in a sheet-metal housing or casing 10, and includes the usual meter motor having the field coils 11, 11, and the rotary armature 12 mounted on a vertical shaft 13, the rotation of which is retarded by the coöperation of the copper disk 14 fixed to the shaft with the stationary permanent magnets 15, 15 of the usual and ordinary construction. As is clearly illustrated, the foot or bottom end of the shaft 13 is supported on a step bearing 16 of any satisfactory construction, the top end of such shaft being maintained in proper position by an adjustable conical bearing 17. Below this bearing the shaft 13 is supplied with the usual commutator and brushes 18, and between such commutator and the bearing 17 the shaft has a small worm 19 meshing with the teeth of a worm wheel 20 on an upper transverse shaft 21 rotatable in a pair of bearings 22 and 23 supported in any approved or desired manner in the meter casing. At its outer end and insulated therefrom, shaft 21 is equipped with an electrically conducting disk 24 having a hub 25, contacting with the cylindrical surface of which is a stationary, conducting spring-brush contact 26.

On top of the motor part of the meter I provide a housing or casing 27 inclosing the registering or recording mechanism, the numerals of which may be displayed through one or more front windows 28. The actuating mechanism of this recording or registering part of the device is operated and rotated by a suitably-mounted rotary gear 29 (Fig. 1), the teeth of which mesh with those of a smaller gear 30, the latter in turn coöperating and coacting with an intermeshing gear 31 on a jack shaft 32 which is connected to the shaft 33 of a small electric actuating motor 34 by the intermeshing pinion 35 and gear 36. It will be apparent therefore that if the motor 34 is energized to rotate the shaft 33, such rotation will be transmitted through the train of gears above described, whereby to operate and rotate the wheels of the registering or recording mechanism.

The electric switch or controller governing the actuation of the motor 34 is composed of the following mentioned parts and instrumentalities: On a suitable support 37, which may be of insulation, or at least insulated from the casing of the meter, I pivot at the point 38 a bell-crank conducting lever or contact 39, the end of the upright arm of which is supplied with a freely-rotatable contact roller 40, such bell crank lever having an insulation extension or arm 41 of the peculiar shape and conformation indicated clearly in Figs. 1 and 3 to 5, inclusive. To the conducting disk 24, I pivot at 42 one end of a contact 43 having an offset insulation extension or prolongation 44, which is adapted in the lowered position of both contacts to lie beside the arm 41, as is indicated in full lines in Fig. 4. The parts 43 and 44 therefore form a unitary construction, one part of which is conductive while the other is of insulation, these two parts being adapted to rest and slide upon the conducting roller 40 of the companion contact 39. A roller 45 is mounted on one side of the gear 31 and is adapted to coact with both of the extensions 41 and 44, whereby to lift both of the contacts 40 and 43 under certain circumstances hereinafter indicated.

Referring to the diagram of electrical connections shown in Fig. 5, it will be apparent that one of the line wires 46 and 47, that is, the former, is connected to the field coil 11 of the meter motor, the other end of such field coil being joined to the house line 48. As is indicated and as is usual, the armature 12 of this meter motor is arranged in shunt to the mains 46 and 47. The recording or registering part of this device is, as is indicated above, actuated by the motor 34, and the latter is connected in shunt relation to the mains 46 and 47, having the controlling switch 40—43 in series relation with such motor, whereby this motor receives energy and current only when such switch is momentarily and intermittently closed. It is to be understood, of course, that the brush 26 is employed for conducting current to the disk 24 and the attached contact 43, the other wire of the motor (34) circuit being connected in any suitable manner to the contact 39.

The operation of this device is practically and substantially as follows: The speed of rotation of the meter shaft 13 is in proportion to the number of watts passing through the motor 11—12. In other words, the speed of rotation of the shaft 13 is in direct proportion to the amount of energy being used by the consumer. If therefore the registering wheels of the recording mechanism are actuated a definite amount for a given number of revolutions of the meter shaft 13, such register or recorder can be caused to display and indicate the amount of current and energy used. In the device illustrated, the wheels of the register are actuated twenty times for each kilowatt hour, although this proportion, of course, need not necessarily be as indicated, since any other suitable relation can be established and maintained if desired. Assuming that the consumer is using electrical energy passing through the meter and that the shaft 13 thereof is revolving, it will be apparent that the rotation of such shaft is transmitted directly to the shaft 21 by the coöperating worm and worm wheel 19 and 20. Under such circumstances, such, for example, as is shown in Fig. 3, the insulation part 44 of the upper contact rests and slides upon the contact roller 40, no current traversing the motor 34 because the contact between the parts 40 and 43 is broken. As the left-hand end of this combined contact and insulation extension 43, 44 rotates in the direction indicated by the arrow, the insulation portion 44 travels first to the left and then to the right as the parts are viewed in Fig. 3. Continued travel of this upper contact and its extension brings the conducting portion 43 thereof into engagement with the roller 40, such relation and coöperation of the contacts being indicated in Fig. 4. Electrical energy immediately passes through the motor 34, causing the rotation of its shaft 33 and the train of gearing also bringing about the desired and definite extent of movement of the wheels of the registering or recording mechanism. During such rotation of the gear 31, the roller 45 rotates clockwise and comes beneath the two extensions 41 and 44, lifting the same to the positions indicated in dotted lines in Fig. 4. The projection 44 is somewhat longer than the extension 41, and during further rotation of the gear 31 the roller 45 passes from its supporting position beneath the arm 41, and as a result the latter and the parts 39 and 40 quickly drop to their original lower position, thereby rapidly breaking contact between the parts 40 and 43 in such a manner as to diminish and practically eliminate all destructive arcing or sparking. This breaking of the circuit of course deënergizes motor 34. The upper and lower contacts remain in this separated condition, as is shown in Fig. 5, until the disk 24 has been rotated by the meter motor sufficiently to withdraw the extension 44 from the roller or pin 45, whereupon the united parts 43 and 44 again drop onto the roller 40, as shown in Fig. 3, but in the meantime the pivoted arm or unitary member 43, 44 has been shifted sufficiently by the partial rotation of the disk 24 so that when this drop occurs the insulation portion 44 strikes the roller 40, instead of the conducting part 43 engaging such roller. The upper contact and its insulation extension now slide on the roller 40, as above described, until electrical contact is again established between the contacts 40 and 43, whereupon a repetition of the movements of the parts above described occurs,—that is, the motor 34 is temporarily supplied with energy sufficient to cause a definite movement of the parts of the register.

To those skilled in this art it will be apparent that the amount of electrical energy consumed by the motor 34 is extremely small and that this motor is only energized for extremely small periods of time, the operation of the registering device taking place momentarily, and of course intermittently, due to the successive contacts between the conducting portions of the switch.

An electrical contact device of the character herein set forth and possessing the peculiar features described and illustrated in detail requires but an extremely small amount of power for its actuation, so that the operation of the motor controller or switch of this mechanism by the motor of the meter proper in no way detrimentally affects the operation of the latter.

Whereas I have herein set forth with some degree of particularity the structural features and characteristics of one embodiment of this invention, it is nevertheless to be understood and noted that the mechanical and electrical features of the device described may be changed to a considerable extent without sacrificing any of the benefits of the invention and without departing from the essence thereof. For example, in some cases it may be feasible to omit the roller 40, which acts, as will be obvious, to a considerable extent as an anti-friction member, and in other cases it may be feasible to modify the electrical connections indicated in Fig. 5, which are merely shown to set forth an example of how the parts may be associated and related.

I claim:

1. In an electrical contact device, the combination of a conducting contact, a member composed of a conducting portion and an insulating part slidably supported intermediate its ends upon said contact, and means pivotally connected with one end of said member to impart a reciprocatory movement to said member to bring the different parts into engagement with the contact to break and close the circuit, substantially as described.

2. In an electrical contact device, the combination of a conducting contact, a member composed of a conducting portion and an insulating part adapted to be supported intermediate its ends upon said contact, means for reciprocating said member to bring the different parts thereof into engagement with the contact to break and close the circuit, and independent means for breaking the circuit between said member and said conducting contact, substantially as described.

3. In an electrical contact device, the combination of a conducting contact roller, a member slidably supported on said roller and composed of a conducting electrical contact portion and an insulating part, and rotating means attached to said member to reciprocate the same and bring the different parts thereof into engagement with the roller to break and close the circuit, substantially as described.

4. In an electrical contact device, the combination of a conducting contact roller, a member slidable in contact with said roller and composed of a conducting electrical contact portion and an insulating part, and means to rotate one part of said member whereby to reciprocate said member and bring the different parts thereof into engagement with the roller to break and close the circuit, substantially as described.

5. In an electrical contact device, the combination of an electrical contact, a member slidable in engagement with said contact and composed of a conducting electrical contact portion and an insulating part, means to rotate one portion of said member to slide the same upon said first contact whereby to bring the different parts of said member into engagement with the contact to break and close the circuit, and means to lift said first contact and member with the pair of contacts in engagement, said means permitting one of said contacts to drop away from the other to quickly break the circuit, substantially as described.

6. In an electrical contact device, the combination of a conducting contact roller, a member slidable in contact with said roller and composed of a conducting electrical contact portion and an insulating part, means to rotate one end of said member whereby to slide its portions into engagement with said roller, and means to lift said roller and member with the former in contact with the conducting part of the latter, said means permitting one of said contacts to drop away from the other after having been thus raised whereby to quickly break the circuit, substantially as described.

7. In an electrical contact device, the combination of a pivoted arm, a contact on said arm, a member slidable in engagement with said contact and composed of a conducting electrical contact portion and an insulating part, a rotary disk, means to rotate said disk, said member being pivoted to said disk whereby said member is slid so as to bring the parts thereof into engagement with said first contact to break and close the circuit, and means to raise said pivoted arm and said member with said first contact and the conducting portion of said member in engagement, said means permitting one of said contacts to drop away from the other after such elevation to quickly break the circuit, substantially as described.

8. In an electrical contact device, the combination of a first contact adapted to be raised and to drop, a member slidable in engagement with said first contact and composed of a conducting electrical contact portion and an insulating part, means to slide said member to bring the different parts thereof into engagement with said first contact, and means to raise both of said contacts while in engagement, said means permitting said first contact to drop after such elevation to quickly break the circuit, said means subsequently permitting said member to drop into engagement with said first contact after said member has been slid so that upon dropping the insulation portion thereof will engage said first contact, substantially as described.

CARL MADISON PAGE.

Witnesses:
WALTER M. FULLER,
ALLEN W. MOORE.

Copies of this patent may be obtained for five cents each, by addressing the "Commissioner of Patents, Washington, D. C."